United States Patent [19]
Russ

[11] Patent Number: 4,475,318
[45] Date of Patent: Oct. 9, 1984

[54] DEVICE FOR CLAMPING CRANKSHAFTS IN GRINDING MACHINES

[75] Inventor: Peter Russ, Monheim, Fed. Rep. of Germany

[73] Assignee: Naxos-Union Schleifmittel-Und Schleifmaschinenfabrik, Frankfurt am Main, Fed. Rep. of Germany

[21] Appl. No.: 347,092

[22] Filed: Feb. 8, 1982

Related U.S. Application Data

[63] Continuation of Ser. No. 106,907, Dec. 26, 1979, abandoned.

[30] Foreign Application Priority Data

Dec. 23, 1978 [DE] Fed. Rep. of Germany ....... 2856037

[51] Int. Cl.³ .............................................. B24B 5/42
[52] U.S. Cl. ........................... 51/237 CS; 51/105 SP; 279/1 L; 279/34
[58] Field of Search ................... 279/1 L, 1 H, 5, 33, 279/34; 409/221, 224, 225; 51/105 SP, 237 CS

[56] References Cited

U.S. PATENT DOCUMENTS

| | | |
|---|---|---|
| 1,391,441 | 9/1921 | Williamson .......................... 279/34 |
| 3,585,763 | 6/1971 | Clark .............................. 51/237 CS |
| 3,841,647 | 10/1974 | Cooper ............................... 279/1 L |
| 3,881,735 | 5/1975 | Joyce .............................. 51/237 CS |
| 4,023,937 | 5/1977 | Smith .............................. 51/237 CS |

Primary Examiner—W. D. Bray
Attorney, Agent, or Firm—Peter K. Kontler

[57] ABSTRACT

A device for clamping a crankshaft in a grinding machine has a rotary face plate which defines a lubricant-filled space and carries two parallel shafts for removable clamping jaws. The jaws can cooperate with a support, which is removably affixed to the face plate, to hold a crankshaft therebetween. The mechanism for pivoting the jaws toward and away from the support has a feed screw which is accessible from the outside of the face plate and extends into the space where it meshes with a nut which can pivot two bell crank levers in opposite directions. The bell crank levers are mounted on the two shafts, and those arms of the levers which must be pivoted by the nut in order to move the respective jaws toward the support carry pistons which deform packages of dished springs when the jaws bear against the crankshaft.

10 Claims, 4 Drawing Figures

DEVICE FOR CLAMPING CRANKSHAFTS IN GRINDING MACHINES

This is a continuation of application Ser. No. 106,907, filed Dec. 26, 1979, abandoned.

BACKGROUND OF THE INVENTION

The invention relates to an arrangement for clamping workpieces in machine tools, particularly for clamping crankshafts in grinding machines or lathes, which is journalled in a spindle stock or secured to an indexing head and is provided with a workpiece support and with pivotable clamping means for receiving and clamping a workpiece, or the terminal crankpin.

Such an arrangement is already known from DE-AS No. 21 10 469. It is journalled in a spindle stock. To receive and clamp the workpiece the arrangement has a workpiece support and a clamping arm which is pivotable by a hydraulic piston and holds the workpiece by engaging the workpiece, the terminal crankpin, opposite the workpiece support by a clamping jaw provided with a planer clamping surface. Since the arrangement is primarily intended for crankshaft grinding machines, both terminal crank pins are clamped in one arrangement each.

It must be considered a disadvantage of the known arrangement that, to operate the hydraulic piston, a substantial amount of hydraulic and electrical control equipment is required and that the one clamping jaw which clamps the workpiece has a planar clamping surface and is not subject to any predetermined initial stress. Due to the small contact surface between the workpiece and the jaw, the situation recurs that a workpiece, which must be clamped in a specific position, turns during machining. Since all operating elements are freely accessible, it is necessary to carry out constant maintenance work.

OBJECTS AND SUMMARY OF THE INVENTION

It is the purpose of the present invention to so further develop an arrangement of the type described hereinbefore that the enumerated disadvantages are avoided, i.e. that the arrangement is of stable construction and largely maintenance free, that it permits absoutely secure clamping of the workpiece and that no electrical or hydraulic supply lines are needed.

According to the invnetion, this task is solved in that two shafts are journalled in a clamping-head body or face plate and extend parallel to the longitudinal center axis of the body at identical spacing from the same but are located opposite one another, and that outside that end face of the body which faces towards the workpiece each of the shafts is secured to a pivotable carrier or clamping arm provided with replaceable jaws. A workpiece support is removably mounted on the clamping-head body in the plane of the clamping jaws. The body defines an enclosed lubricant-filled space for motion transmitting means which can rotate the shafts by way of a threaded spindle or feed screw actuatable from the outside of the body but extending into the closed space and cooperating with a shiftable nut in such a manner that the clamping jaws can be caused to assume an ineffective or an effective position.

Due to the use of two clamping jaws and a workpiece support, a reliable clamping of the workpiece is assured: this is further enhanced in that the surfaces contacting the workpiece exactly conform to the shape of the workpiece to be clamped. This is easily possible because because the parts are accessible from the outside and, in addition, are exchangeable. Since clamping by the threaded spindle is effected manually or with a separable drive, no supply lines are required and since nearly all motion transmitting means and drive parts for the clamping arms or carriers installed in the closed, lubricant-filled space, wear is low and maintenance is largely eliminated. Furthermore, the device is of stable construction and it can subject the jaws to a certain bias for adequate clamping of the workpiece.

The two clamping jaws and the workpiece support are so arranged that they are approximately uniformly distributed about the circumference of the workpiece to be clamped. For safety reasons it is advisable to provide between the ends of the clamping arms a device which indicates the positions of the clamping jaws.

According to the inventions it is further proposed that the motion transmitting means connected to each shaft in the closed space consist of a springy clamping element connected with a lever arm. The operating surfaces of the clamping element and of an abutment member extend at an acute angle to one another and can engage a rotary element such as an operating roll which is rotatably mounted in a nut. Shifting of the nut entails a shifting of the operating roll, so that it alternately cooperates with the two operating surfaces. The lever arm for the clamping element and a lever arm for the abutment member preferably constitute a bell crank lever which is mounted on the respective shaft.

Each clamping element consists, according to the invention, of a cupped housing part, a piston longitudinally slidably guided in the cupped part, and spring elements which press the piston (and thereby the operating surface of the clamping element) outwardly, the spring elements preferably constituting packages of dished springs which surround a portion of the piston between an abutment surface on the piston and an end face of the cupped part.

As a further development of the invention it is suggested to arrange the threaded spindle in the closed space in radial direction and to provide it outside the clamping head body with a polygonal portion so that it can be turned manually with the aid of a wrench or by a separable drive. If a drive is used, limit sensors or limit abutments for limiting the stressing of the clamping elements and the maximum paths for the abutment members are provided thereon.

Finally, the invention also suggest to provide at the outside, i.e. on that end face of the clamping head body which faces the workpiece, planar faces for securing of abutments and gauges.

That end face of the clamping head body which faces the indexing head or the spindle stock, is provided with a cover which tightly closes the oiltight space. The cover is guided in a centering device of the main portion of the clamping head body and is secured against rotation by a spline. The free end face of the cover conforms to the surface of the drive part.

Finally, mention is made that here, also—e.g. for machining of multi-throw crankshafts—each terminal crankpin is clamped in a device according to the invention, whereby accurate machining is assured.

Further details of the invention may be determined from the following description of an exemplary embodiment which is illustrated in the drawings.

DESCRIPTION OF THE PREFERRED EMBODIMENTS

Figure 1:
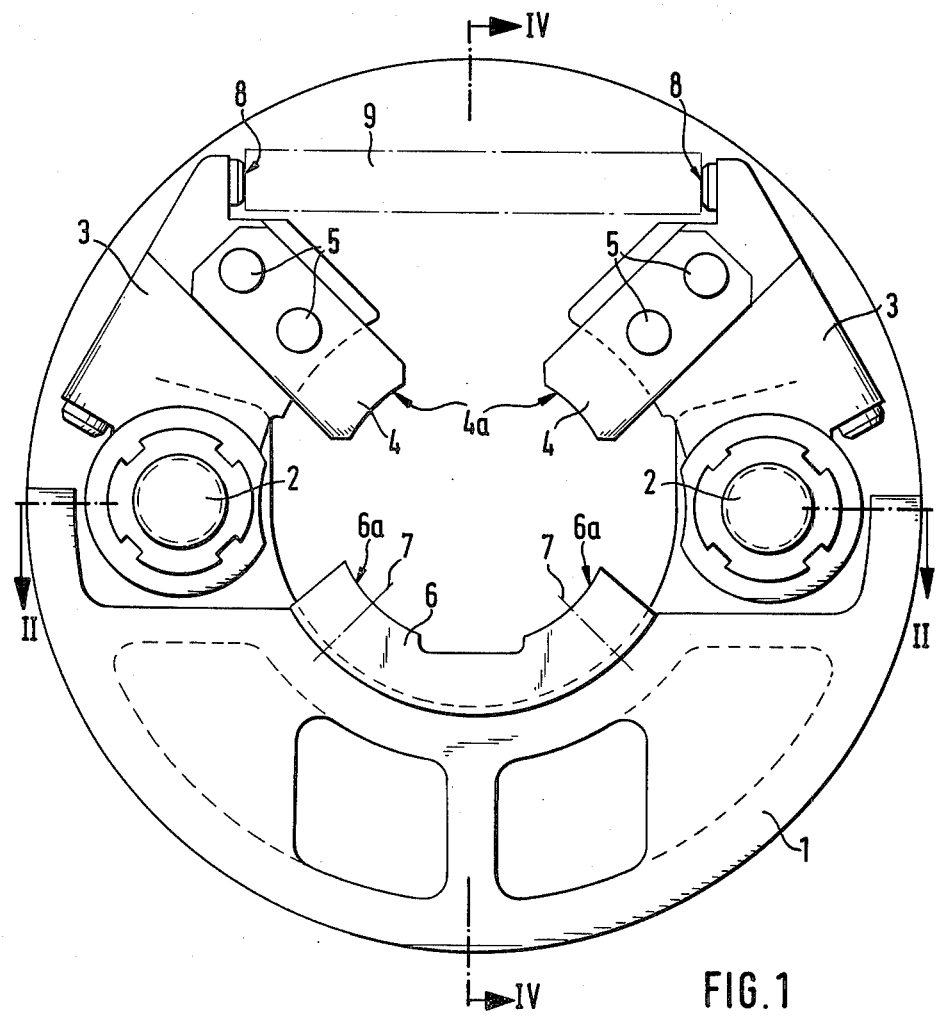
FIG. 1 is a perspective view of the novel device, as seen from the clamping side of the workpiece.

In all Figures identical parts are identified with like reference numerals, and only the parts essential for the invention are so designated.

Two shafts 2 are extended outwardly in direction towards the clamping position for the non-illustrated workpiece in FIG. 1, through a round clamping head body or face plate 1. Clamping arms or carriers 3 are secured to the free ends of the shafts 2, preferably protected against turning by the use of a polygonal profile, and on each of these a clamping jaw 4 extending in radial direction towards the center of the clamping head body 1, is removably secured by screws 5. A workpiece support 6 is located in the same plane as the clamping jaws 4 and is secured to the lower part of the clamping head body 1 by means of only diagrammatically shown screws 7. The clamping jaws 4 and the workpiece support 6 are so distributed in the circumferential direction of the body 1 that a uniform clamping of the workpiece is obtained, with a portion of the workpiece support 6 located opposite each clamping jaw 4; to obtain secure holding, each of the workpiece-contacting surfaces 4a, 6a conforms to the shape of the workpiece to be machined. The workpiece can be clamped or released by mutually opposite pivoting of the two carriers 3. To obtain a good clamping action, the exemplary embodiment is provided with a gage between two abutments 8 of the clamping arms 3 to indicate the degree of clamping action.

Figure 2:
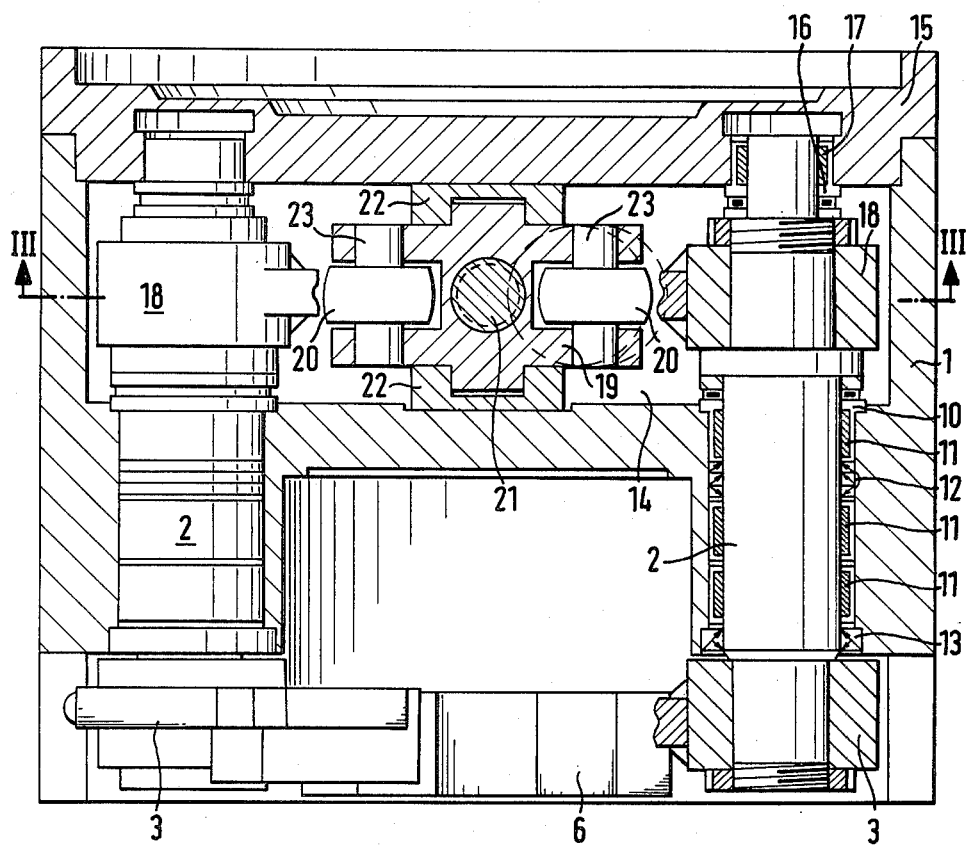
FIG. 2 is a sectional view as seen in the direction of arrows from the line II—II of FIG. 1.

FIG. 2 shows that each of the shafts 2 is journalled in an axial bearing 10 and several radial bearings 11. Seals 12, 13 prevent leakage of oil onto the end face receiving the workpiece. A lubricant-filled space 14 in the main portion of the clamping head body 1 is oiltightly closed by a cover 15. Each of the shafts 2 is journalled in the cover 15 by an additional axial bearing 16 and a radial bearing 17. Mounted on the shafts 2 within the oiltightly closed space 14, and protected against relative turning, are bell crank levers 18 as will be described in detail with reference to FIG. 3. Each bell crank lever 18 carries motion transmitting means which cooperate with a rotary element, such as an operating roll 20, rotatably mounted in a nut 19 by a shaft 23. A threaded spindle of feed screw 21 meshes with the nut 19 and can shift the nut in radially outwardly extending guides 22.

Figure 3:
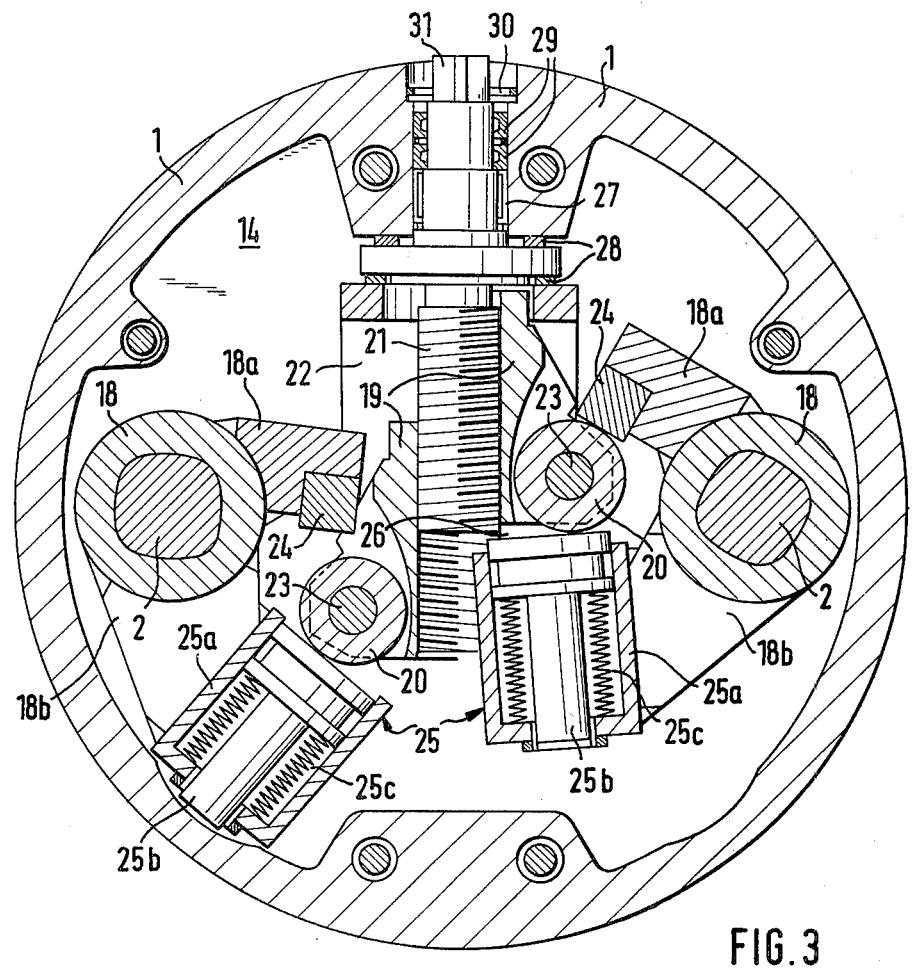
FIG. 3 is a sectional view as seen in the direction of arrows from the line III—III of FIG. 2.

The last-described parts are more clearly recognizable in FIG. 3. Each bell crank lever 18 has two arms 18a, 18b. The arm 18a of each lever 18 carries an abutment member 24, the arm 18b of each lever 18 carries a clamping unit 25 consisting of a cupped element or housing or sleeve 25a, a clamping element or piston 25b guided in this sleeve and packages of dished springs 25c arranged between the end face of the sleeve 25a and a larger diameter operating surface 26 of the piston 25b, with the springs tending to press the piston 25b in outward direction. The operating surface of the abutment member 24 and the operating surface 26 of the respective piston 25b make an acute angle. The operating rolls 20 on the nut 19 are located between the operating surfaces of the corresponding abutment members 24 and pistons 25b. As already mentioned, the nut 19 cooperates with the radially outwardly extending threaded spindle 21 which is so journalled in an axial bearing 27 and in radial bearings 28 that it can absorb radial as well as bi-axially acting forces. To assure that space 14 remains oil tight, the threaded spindle 21 is provided with seals 29, 30 and in addition has outside the same a polygonal actuating portion 31 for its operation. The left half of FIG. 3 shows the nut 19 in its lower end position in which the corresponding operating roll 20 biases the actuating surface 26 of the associated piston 25b. In the right half of FIG. 3 the nut 19 is located in its upper end position in which the clamping jaws 4 (FIG. 1) are inoperative.

Figure 4:
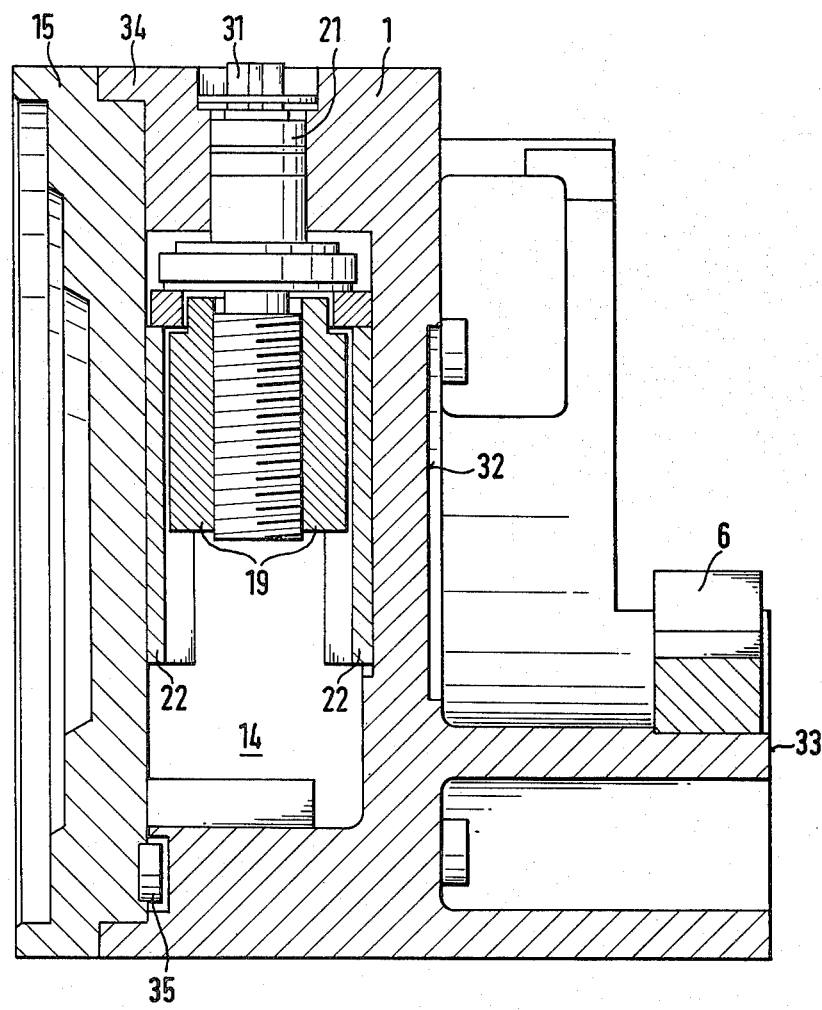
FIG. 4 is a sectional view as seen in the direction of arrows from the line IV—IV of FIG. 1.

In FIG. 4, the nut 19 is in its upper end position. The guides 22 are clearly discernible. On the side facing towards the workpiece, the clamping head body 1 additionally has planar faces 32, 33 for securing of abutments or gauges, so that the workpiece can be inserted into the workpiece support only in the desired orientation. The cover 15 closing the space 14 is a round plate and is guided in a centering device 34 of the main portion of the clamping head body 1. To asssure that the cover 15 assumes the proper position relative to the clamping head body in the direction of rotation also, a key 35 is provided between the parts 1, 15. The construction of the outer end face of the cover 15 may differ, depending upon the counterpart, in the present example a special indexing head being provided.

OPERATION

If a workpiece is to be clamped in the device, the surface 4a, 6a of the clamping jaws 4 and the workpiece support 6 must first conform to the shape of the workpiece and be secured to the carriers 3 and the body 1, respectively, by means of screws 5 and 7. Thereafter, the polygonal actuating portion 31 of the threaded spindle 21 is turned manually or by means of an appropriate drive, preferably in a counterclockwise direction, with the number of required revolutions being set and locked in at the drive. Due to this the nut 19 moves upwardly, as viewed in the right-hand portion of FIG. 3. The operating rolls 20 therefore reach the abutments 24 and turn the shafts 2 outwardly in mutually opposite directions via the arms 18a, whereby the carriers 3 simultaneously also pivot outwardly. The workpiece can now be inserted into the workpiece support 6 in the proper orientation, with the aid of the abutments or gauges provided on the planar faces 32, 33.

Thereafter one turns the polygonal actuating portion 31 and thereby the screw spindle 21 in a clockwise direction, whereby the nut 19 moves downwardly. The operating rolls 20 move away from the abutments 24 to engage the actuating surfaces 26 of the pistons 25b and via these and the untensioned dished springs 25c press the cupped housing parts 25a downwardly, causing the shafts 2 and thus the carriers 3 to turn with the bell crank levers 18 until the abutment faces 4a of the clamping jaws 4 engage the workpiece and cannot move any closer towards one another (FIG. 1). The threaded spindle 21 is now rotated further in a clockwise direction and the pistons 25b are pressed into the respective cupped parts 25a against the opposition of the dished springs 25c. In this manner, one obtains the bias which is required to hold the workpiece. The bias is determined by the non-illustrated drive for the threaded spindle 21. After removal of this drive, the workpiece remains firmly clamped since the thread of the threaded spindle 21 is of the self-locking type. The rotational movement of the total system with the clamped workpiece, and thus the machining of e.g. that crankpin of a crankshaft which is in machining position, can begin.

I claim:

1. A device for clamping workpieces in machine tools, particularly for clamping crankshafts in grinding machines, comprising a rotary face plate having an end face and defining a lubricant-filled space; first and second shafts rotatably mounted in said face plate, the axis of said shafts being parallel to and equidistant from the axis of rotation of said face plate; first and second carriers affixed to the respective shafts for rotational movement therewith adjacent to said end face; first and second clamping jaws; means for separably securing said jaws to the respective carriers; a workpiece support coplanar with said jaws and adjacent to said end face; means for securing said support to said face plate so that said support and said jaws surround a workpiece which is inserted therebetween adjacent to said end face; a feed screw rotatably mounted in said face plate and having an actuating portion disposed outside of and an externally threaded portion disposed in said space; a nut meshing with said externally threaded portion; and motion transmitting means provided in said space and cooperating with said nut to pivot said carriers through the medium of the respective shafts in response to rotation of said feed screw and to thereby move said jaws nearer to or further away from said support for the purpose of engaging or releasing a workpiece.

2. The device of claim 1, wherein said support and said jaws have work-contacting surfaces conforming to the outlines of the adjacent portions of a workpiece therebetween and being substantially uniformly distributed about the axis of rotation of said face plate, the surface of said support having first and second portions disposed opposite the surfaces of the respective jaws.

3. The device of claim 1, wherein said carriers comprise abutments and further comprising a gauge disposed between said abutments and arranged to indicate the positions of said jaws with reference to said support.

4. The device of claim 1, wherein said motion transmitting means comprises first and second levers secured to the respective shafts in said space, each of said levers having a first and a second arm and said motion transmitting means further comprising abutments on the first arms of said levers, spring-loaded clamping elements provided on the second arms of said levers, said abutments and said clamping elements having operating surfaces and the operating surface of each abutment making an acute angle with the operating surface of the respective clamping element and said motion transmitting means further comprising first and second rotary elements provided on said nut and disposed between the operating surfaces of the abutments and clamping elements on the respective levers.

5. The device of claim 4, wherein each of said levers is a bell crank lever.

6. The device of claim 4, wherein said motion transmitting means further comprises a cupped housing on each of said second arms and said clamping elements are reciprocably installed in the respective housings, said motion transmitting means further comprising springs reacting against said housings and arranged to bias the respective clamping elements toward the corresponding rotary elements on said nut.

7. The device of claim 6, wherein each of said springs is a composite spring including a package of dished springs, said clamping elements comprising pistons having portions surrounded by the respective dished springs.

8. The device of claim 1, wherein said feed screw extends substantially radially of the axis of rotation of said face plate, said actuating portion having a polygonal outline and further comprising guide means provided in said space and defining a path for reciprocatory movement of said nut in response to rotation of said feed screw in opposite directions.

9. The device of claim 1, wherein the actuating portion of said feed screw is rotatable by a manually operated tool.

10. The device of claim 1, wherein said face plate comprises a main portion defining said space and a cover remote from said end face and arranged to seal said space from the surrounding atmosphere, said main portion having means for centering said cover thereon and means for preventing rotation of said cover with reference thereto.

* * * * *